[12] United States Patent
Chen

US008537139B2
US 8,537,139 B2
Sep. 17, 2013

(10) Patent No.:
(45) Date of Patent:

(54) OPTICAL TOUCH CONTROL DEVICE AND OPTICAL TOUCH CONTROL SYSTEM

(75) Inventor: Yu-Yen Chen, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 87 days.

(21) Appl. No.: 13/217,266

(22) Filed: Aug. 25, 2011

(65) Prior Publication Data

US 2012/0287083 A1 Nov. 15, 2012

(30) Foreign Application Priority Data

May 12, 2011 (TW) .............................. 100116714 A

(51) Int. Cl.
  *G06F 3/042* (2006.01)
  *G06F 3/041* (2006.01)
  *G09G 5/00* (2006.01)

(52) U.S. Cl.
  USPC ............. 345/175; 345/173; 345/1.3; 345/156

(58) Field of Classification Search
  USPC ................... 345/207, 173–176, 156, 1.1, 1.3; 715/863
  See application file for complete search history.

(56) References Cited

U.S. PATENT DOCUMENTS

| | | | | |
|---|---|---|---|---|
| 5,483,261 A * | 1/1996 | Yasutake | ........................ | 345/173 |
| 6,377,228 B1 * | 4/2002 | Jenkin et al. | ................... | 345/1.3 |
| 7,453,418 B2 * | 11/2008 | Palmquist | ...................... | 345/1.1 |
| 7,683,856 B2 * | 3/2010 | Sakai et al. | ..................... | 345/1.3 |
| 7,948,479 B2 * | 5/2011 | Liu et al. | ........................ | 345/173 |
| 8,013,845 B2 * | 9/2011 | Ostergaard et al. | ........... | 345/176 |
| RE43,084 E * | 1/2012 | Fujioka | .......................... | 345/175 |
| 8,125,460 B2 * | 2/2012 | Yang | .............................. | 345/173 |
| 8,169,380 B2 * | 5/2012 | Madonna et al. | .............. | 345/1.3 |
| 8,269,754 B2 * | 9/2012 | Nagata | .......................... | 345/207 |
| 8,325,156 B2 * | 12/2012 | Lai | ................................ | 345/175 |
| 8,350,831 B2 * | 1/2013 | Drumm | ......................... | 345/175 |
| 8,362,977 B2 * | 1/2013 | Kim et al. | ........................ | 345/63 |
| 8,363,018 B2 * | 1/2013 | Chang et al. | ................... | 345/173 |
| 8,373,660 B2 * | 2/2013 | Pallakoff | ........................ | 345/163 |
| 8,390,586 B2 * | 3/2013 | Kawano et al. | ................ | 345/173 |
| 2002/0075243 A1 * | 6/2002 | Newton | ......................... | 345/173 |
| 2008/0303786 A1 * | 12/2008 | Nakamura et al. | ............. | 345/156 |
| 2009/0128508 A1 * | 5/2009 | Sohn et al. | ...................... | 345/173 |
| 2009/0141002 A1 * | 6/2009 | Sohn et al. | ...................... | 345/175 |
| 2009/0267903 A1 * | 10/2009 | Cady et al. | ...................... | 345/173 |
| 2010/0277434 A1 * | 11/2010 | Chang et al. | ................... | 345/174 |
| 2010/0315381 A1 * | 12/2010 | Yi et al. | ......................... | 345/175 |
| 2011/0074738 A1 * | 3/2011 | Ye et al. | ......................... | 345/175 |
| 2011/0175849 A1 * | 7/2011 | Ko | ................................. | 345/175 |
| 2011/0234539 A1 * | 9/2011 | Liao et al. | ...................... | 345/175 |
| 2011/0242042 A1 * | 10/2011 | Xu | ................................. | 345/174 |
| 2011/0291991 A1 * | 12/2011 | Lin | ................................ | 345/175 |
| 2012/0007815 A1 * | 1/2012 | Kim et al. | ...................... | 345/173 |
| 2012/0032926 A1 * | 2/2012 | Douxchamps et al. | ........ | 345/175 |
| 2012/0056821 A1 * | 3/2012 | Goh | .............................. | 345/173 |
| 2012/0062475 A1 * | 3/2012 | Locker et al. | .................. | 345/173 |

(Continued)

*Primary Examiner* — Dwayne Bost
*Assistant Examiner* — Darlene M Ritchie
(74) *Attorney, Agent, or Firm* — Winston Hsu; Scott Margo

(57) ABSTRACT

An optical touch control device includes a detection area, a plurality of image capturing modules, for capturing a plurality of images on the detecting area, and a processing module, coupled to the plurality of image capturing modules, for determining a touch status of the detection area according to variations of the plurality of images, wherein a plurality of capture angles of the plurality of image capturing modules relative to the detection are greater than 90°.

17 Claims, 5 Drawing Sheets

(56) References Cited

U.S. PATENT DOCUMENTS

2012/0084738 A1* 4/2012 Sirpal ........................... 715/863
2012/0162138 A1* 6/2012 Lee et al. ...................... 345/175
2012/0212454 A1* 8/2012 Kiyose .......................... 345/175
2012/0327031 A1* 12/2012 Fujioka ......................... 345/175

* cited by examiner

OPTICAL TOUCH CONTROL DEVICE AND OPTICAL TOUCH CONTROL SYSTEM

BACKGROUND OF THE INVENTION

1. Field of the Invention

The invention relates to an optical touch control device, and more particularly, to a combinable and expandable optical touch control device.

2. Description of the Prior Art

Common types of touch sensing devices include capacitative, resistive, and optical. A capacitative or resistive touch control device determines a touch event via detecting variations in electrical characteristics (capacitance or resistance) generated when the human body touches a touch panel. Such detection methods are not conducive to large-dimension applications, and thus optical touch control systems have been developed for these operations.

Optical touch control technologies dispose an infrared (IR) light source around a touch area, and shadows generated by objects on the touch area that obstruct the infrared light source are detected using IR Cameras and CMOS Sensors. Information such as direction, height and width of the shadows is captured, and in turn used to determine a position of a touch point.

An optical touch control system has the advantage of cost-effectiveness in that, regardless of the dimensions of the touch area, only two sensors need to be placed at corners of the touch area. In particular, the larger the touch area, the lower a unit production cost for the touch screen may be obtained. For optical touch screens of different dimensions, however, resolutions and focal distances of the sensors, as well as lighting ranges of the infra-red light source, need to be fine-tuned, and adjustments have to be made to reflective/light-emitting borders of the touch screens. Therefore, the user is unable to arbitrarily expand dimensions of smaller optical touch screens. Furthermore, touch screens are often rectangular in shape, and do not allow arbitrary combinations into touch screens of other geometrical shapes. Therefore, the prior art leaves much room for improvement.

SUMMARY OF THE INVENTION

The invention primarily provides an optical touch control device and an optical touch control system.

An embodiment of the invention discloses an optical touch control device, comprising: a detection area; a plurality of image capturing modules, for capturing a plurality of images on the detection area; and a processing module, coupled to the plurality of image capturing modules, for determining a touch status of the detection area according to variations of the plurality of images; wherein a plurality of capture angles of the plurality of image capturing modules relative to the detection area are greater than 90°.

Another embodiment of the invention further discloses an optical touch control system comprising: a plurality of optical touch control devices, each optical touch control device comprising a detection area; a plurality of image capturing modules, for capturing a plurality of images on the detection area; and a processing module, coupled to the plurality of image capturing modules, for determining a touch status on the detection area according to variations of the plurality of images; and a touch processor, coupled to each processing module of the plurality of optical touch control devices, for calculating a global touch status according to the touch status determined by each processing module; wherein a plurality of capture angles of the plurality of image capturing modules relative to the detection area are greater than 90°.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
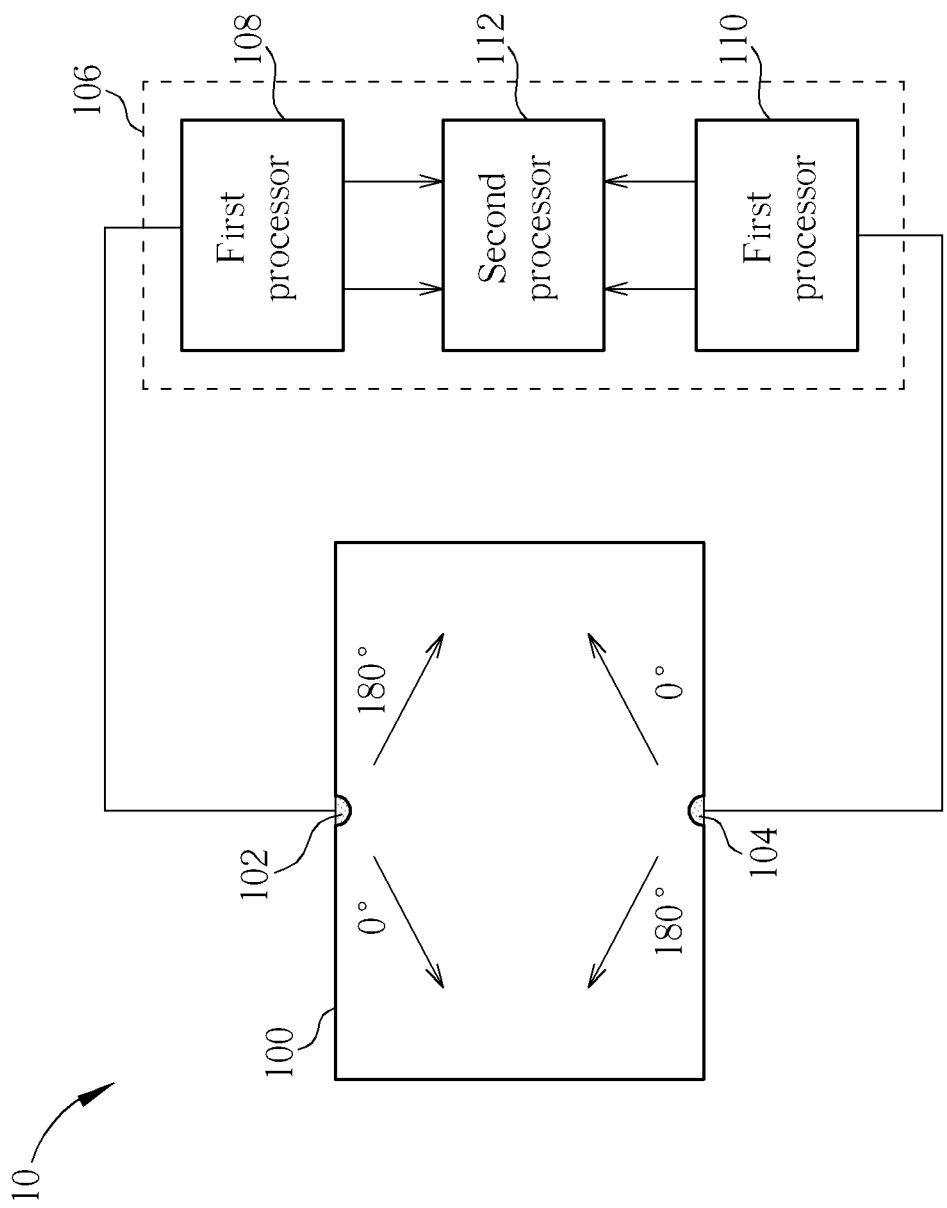
FIG. 1 is a schematic diagram of an optical touch control device according to an embodiment of the invention.

Please refer to FIG. 1, which is a schematic diagram of an optical touch control device 10 according to an embodiment of the invention. The optical touch control device 10 includes a detection area 100, image capturing modules 102, 104 and a processing module 106. The image capturing modules 102, 104 are for capturing images on the detection area 100, and the processing module 106 can determine variations of the images captured by the image capturing modules 102, 104, and determine a touch status on the detection area 100 accordingly. Operations of the processing module 106 determining the touch status on the detection area 100 are similar to that of an optical touch device of the prior art. An important distinction, however, is that the image capturing modules 102, 104 are capable of capturing wide-angle images, i.e. having capturing angles greater than 90°. As such, the image capturing modules 102, 104 can be disposed on a border of the detection area 100, and are not limited to being disposed at corners of the detection area 100. More importantly, this characteristic further allows combination and expansion of multiple optical touch control devices 10 into a touch screen of a larger dimension, and also allows arrangement of the multiple optical touch control devices 10 into a touch screen of geometrical shapes other than rectangular.

In more detail, as shown in FIG. 1, the image capturing modules 102, 104 are disposed on an upper and lower border of the detection area 100, respectively, and both have 180° wide capturing angles. The image capturing modules 102, 104 are capable of concurrently capturing two wide-angle images corresponding to the detection area 100 so the processing module 106 can determine the touch status thereof. Furthermore, in this embodiment, the processing module 106 is composed of the first processors 108, 110 and a second processor 112, for first dividing the wide-angle images outputted by the capturing modules 102, 104, and then determining the touch status. The first processors 108, 110 are coupled to the image capturing modules 102, 104, respectively, for dividing the 180° wide-angle images outputted by the image capturing modules 102, 104 into two equal parts of 0°-90° and 90°-180° (i.e. a left half and a right half of the detection area 100). The second processor 112 determines the touch status according to the two equally divided parts of the wide-angle images.

Please note that the optical touch control device 10 is an embodiment of the invention; modifications may be made by those skilled in the art accordingly, and are not limited thereto. For example, the wide-angle images outputted by the image capturing modules 102, 104 are not limited to 180°, but can also be 270°, 360°, or any wide-angle images greater than 90°. The processing module 106 divides the images only to simplify calculations, and other possible ways of determining the touch status are not limited thereto. Other ways of determining the touch status such as angles used for dividing the images, or a quantity of equal parts being created into which to divide the images, are all within the scope of the invention. For instance, it is possible to divide the images into equal parts of 0°-45°, 45°-90°, 90°-135°, and 135°-180°.

Figure 5:
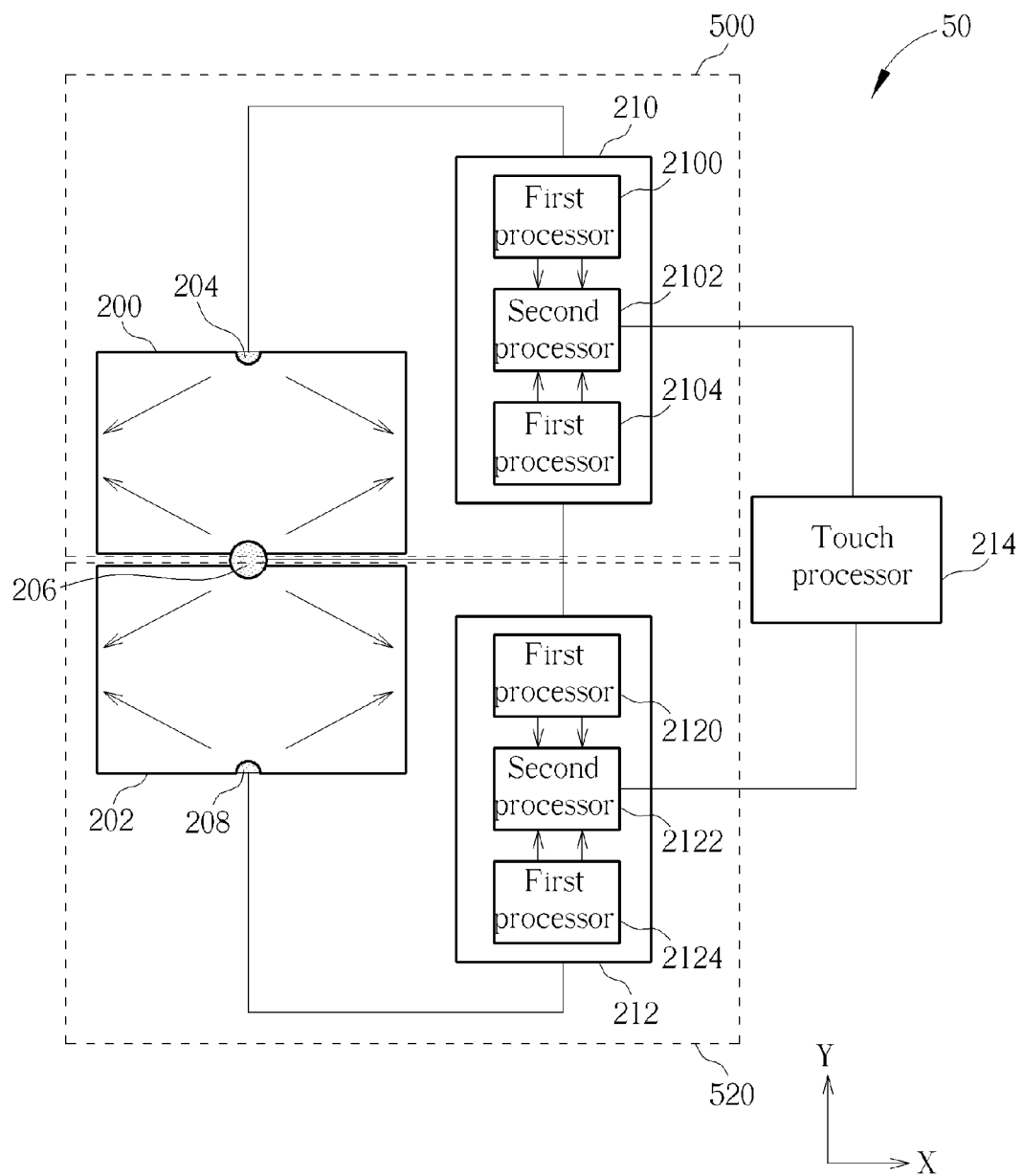

Through suitably adjusting capture angles of the image capturing modules, it is possible to combine or expand the optical touch control devices of the invention to implement an optical touch control system. Please refer to FIG. 2, which is a schematic diagram of an optical touch control system 20 according to an embodiment of the invention. The optical touch control system 20 includes detection areas 200, 202, image capturing modules 204, 206, 208, processing modules 210, 212 and a touch processor 214. Comparing FIGS. 1 and 2, it can be seen that the optical touch control system 20 is composed of two optical touch control devices 10. Namely, the detection area 200, the image capturing modules 204, 206 and the processing module 210 can be collectively seen as equivalent to the optical touch control device 10. Similarly, the detection area 202, the image capturing modules 206, 208 and the processing module 212 can be collectively seen as equivalent to the optical touch control device 10. Please refer to FIG. 5, which illustrates a schematic diagram of another optical touch control system 50 according to an embodiment of the invention, wherein the optical touch control system 50 comprises two optical touch control devices 500 and 520. As shown in FIG. 5, the optical touch control devices 500 and 520 are both connected to the touch processor 214, and can be realized according to embodiments shown in FIG. 1 and FIG. 2, wherein the processing module 210 of the optical touch control device 500 further comprises first processors 2100, 2104 and a second processor 2102, and the processing module 212 of the optical touch control device 520 further comprises first processors 2120, 2124 and a second processor 2122. Also, the image capturing modules 206 has a wide-angle capture angle equal to (or approximately) 360° and can be shared by the optical touch control devices 500 and 520, which is not limiting the scope of the invention. Therefore, although the optical touch control system 50 is composed of two optical touch control devices 500 and 520, only three image capturing modules are needed.

In the optical touch control system 20, the touch processor 214 is coupled to the processing modules 210, 212, for calculating a global touch status according to the touch status determined by the processing modules 210, 212. In more detail, the processing modules 210, 212 are for determining local touch statuses of the detection areas 200, 202, respectively. Assuming a size of both the detection areas 200, 202 to be 600×400, the optical touch control system 20 may be seen as equivalent to having a global detection area with a size of 600×800, after combination. Therefore, the touch processor 214 may calculate a touch status of the global detection area via coordinate transformation. For example, the detection area 200 has coordinates (0-600, 0-400), which correspond to coordinates (0-600, 400-800) on the global detection area. As such, the touch processor 214 can be mapped to a local touch point $(X_{LOCAL}, Y_{LOCAL})$ on the detection area 200 to a global touch point on the global detection area, with coordinates $(X_{GLOBAL}, Y_{GLOBAL})=(X_{LOCAL}, Y_{LOCAL}+400)$. In other words, there is a mapping relationship between the detection area 200 and the global detection area: $X_{LOCAL}=X_{GLOBAL}$, $Y_{LOCAL}+400=Y_{GLOBAL}$. Similarly, local touch points on the detection area 202 may also be mapped to the global detection area. If relationships between each of the local detection areas and the global detection area are established beforehand, then it is possible to send the local touch points determined by the processing module of each local detection area to the touch processor 214 to calculate a global touch point. The objective of combining two optical touch control devices into a larger touch screen (i.e. the optical touch control system 20) may be achieved.

Figure 2:
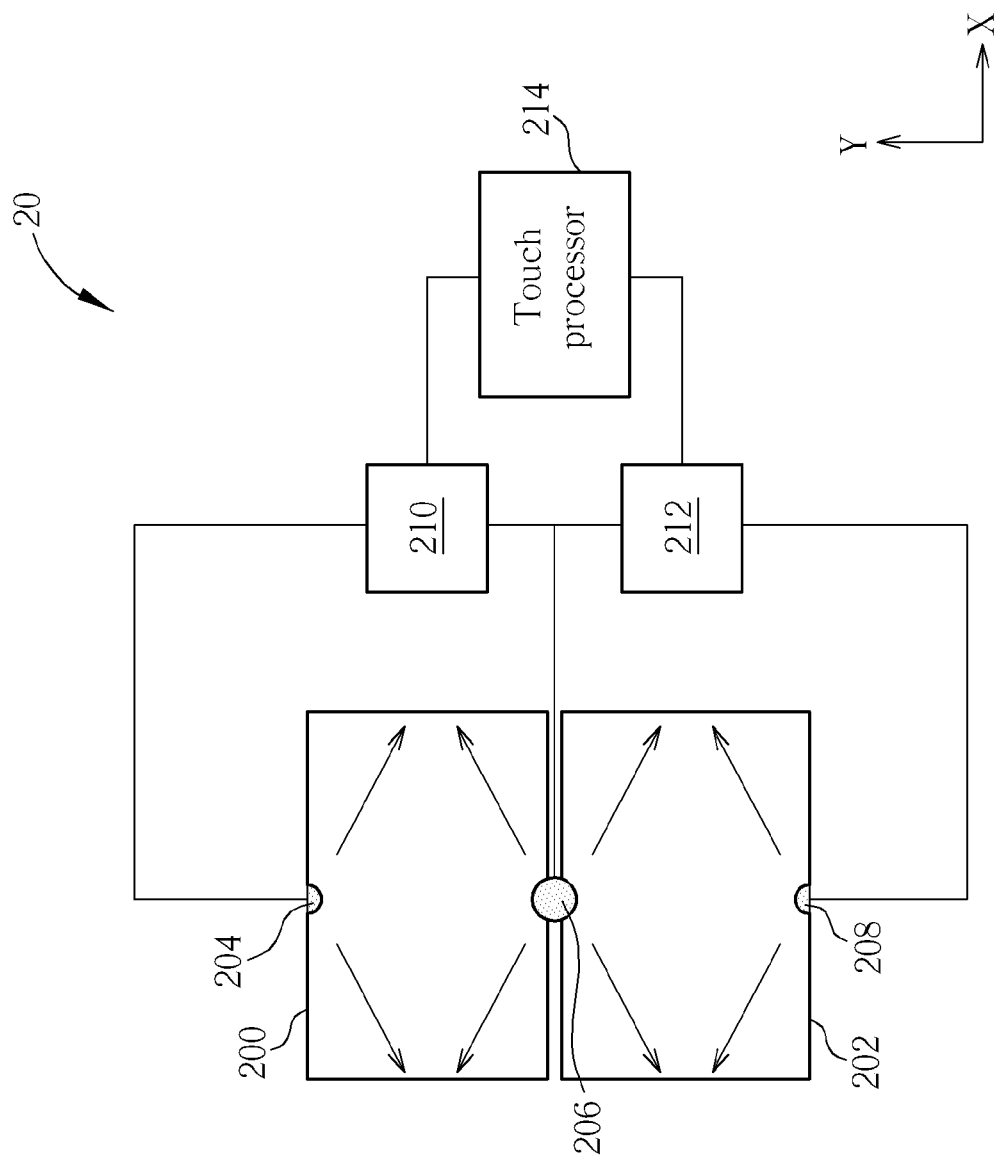
FIG. 2 and FIG. 5 are schematic diagrams of optical touch control systems according to embodiments of the invention.
Figure 3:
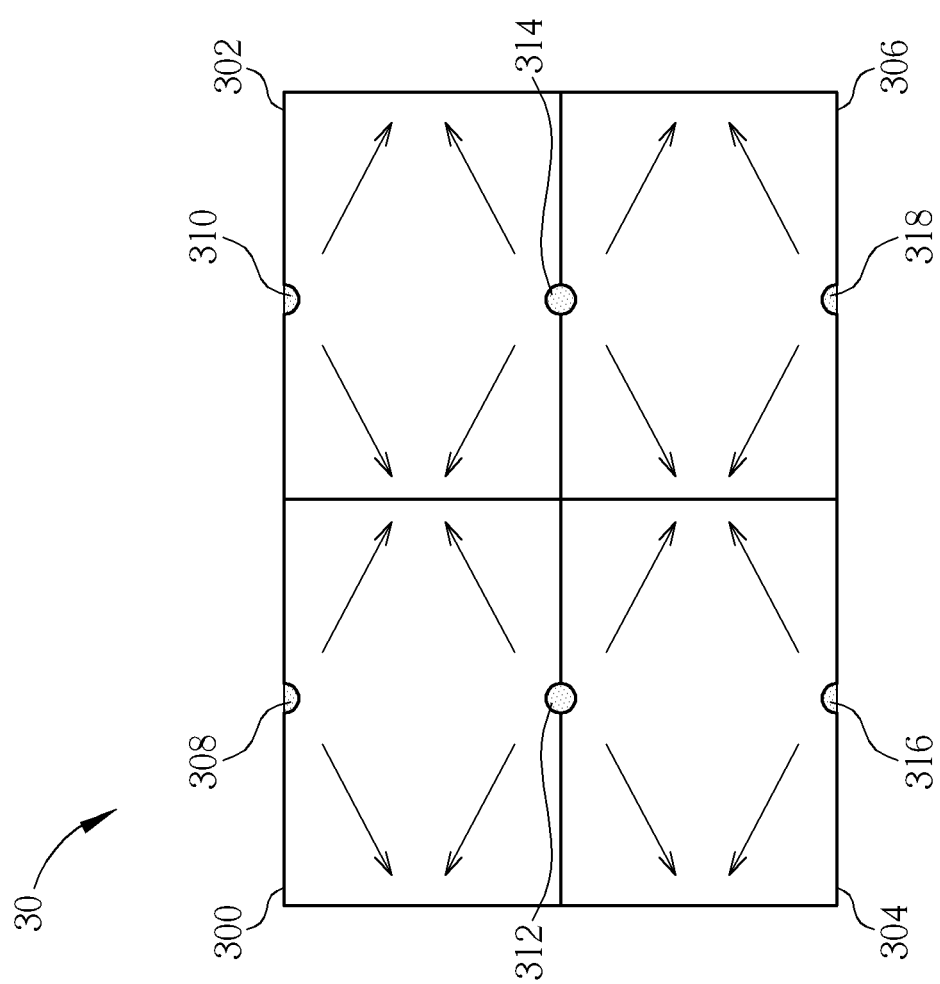
FIGS. 3 and 4 are schematic diagrams of combining the optical touch control device shown in FIG. 1 into different optical touch control systems according to an embodiment of the invention.

The optical touch control system 20 shown in FIG. 2 stacks the optical touch control devices 10 vertically to implement a larger touch screen. Any method for expansion may be employed in the invention, however, and is not limited thereto. For example, please refer to FIGS. 3 and 4, which are schematic diagrams of combining the optical touch control device 10 shown in FIG. 1 into optical touch control systems 30, 40. For conciseness, processing modules and touch processors of the optical touch control system 30, 40 are omitted from FIGS. 3 and 4. Please refer back to the optical touch control system 20 shown in FIG. 2 for detailed structures of the optical touch control system 30, 40. As shown in FIG. 3, the optical touch control system 30 includes detection areas 300, 302, 304, 306, and image capturing modules 308, 310, 312, 314, 316, 318. The optical touch control system 30 may be seen as being composed of four optical touch control devices 10. In other words, the optical touch control system 30 is capable of easily arranging four optical touch control devices 10 to obtain a touch screen having an expanded area that is four times the original, without any additional hardware components. Moreover, the image capturing modules 312, 314 preferably have wide capture angles equal to (or approximating) 360°, and are shared by upper and lower optical touch control devices. Although the optical touch control system 30 is composed of four optical touch control devices 10, only six image capturing modules are required.

Figure 4:
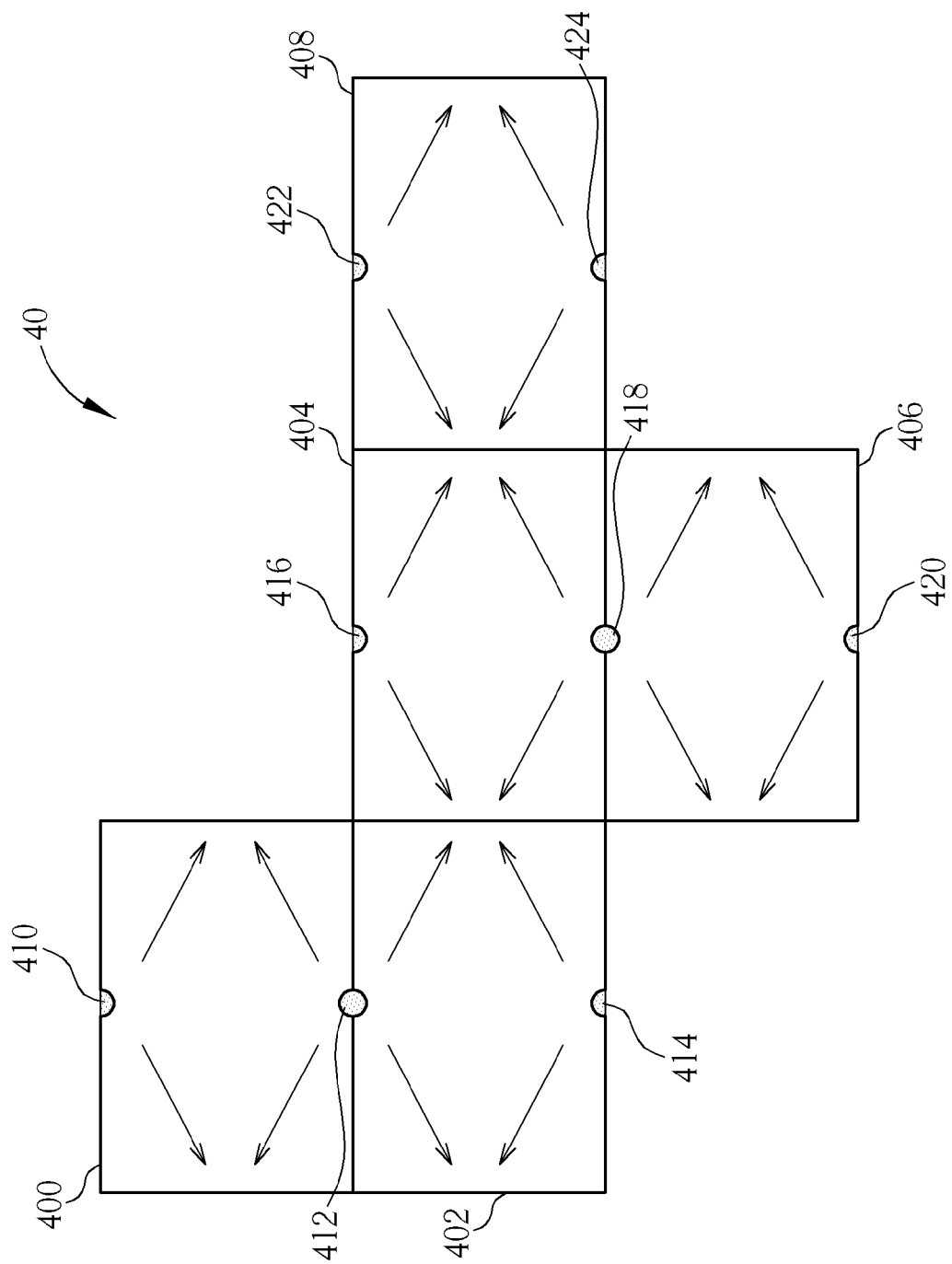

As shown in FIG. 4, the optical touch control system 40 includes detection areas 400, 402, 404, 406, 408, and image capturing modules 410, 412, 414, 416, 418, 420, 422, 424. The optical touch control system 40 can be seen as being composed of five optical touch control devices 10 arranged into a geometrical shape. The image capturing modules 412, 418 preferably have wide capture angles that are equal to (or approximately) 360°, and are shared by upper and lower optical touch control devices. Although the optical touch control system 40 is composed of five optical touch control devices 10, only eight image capturing modules are required.

As can be seen from the above, the prior art does not allow arbitrary combinations of small-dimension optical touch screens into a larger touch screen, or into a touch screen of a geometrical shape other than rectangular. The optical touch control device of the invention allows multiple optical touch control devices to be easily combined, expanded, and arranged into different geometrical shapes, without any modification of hardware components.

Furthermore, since the invention employs wide-angle image capturing modules that can be shared by neighboring optical touch control devices, it is possible to reduce a quantity of required sensors in large-dimension applications. Wide-angle image capturing modules can be disposed on borders of the detection areas, and are not limited to corners of the detection areas. This allows more flexibility in design and in disposing the image capturing modules in various applications.

In summary, the invention is capable of combining multiple optical touch control devices with wide-angle image capturing modules into a large-dimension optical touch control system of any geometrical shape, without modifying any hardware components.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch control device, comprising:
   a detection area;
   a plurality of image capturing modules, for capturing a plurality of images on the detection area; and
   a processing module, coupled to the plurality of image capturing modules, for determining a touch status of the detection area according to variations of the plurality of images;
   wherein a capture angle captured by each of the plurality of image capturing modules relative to the detection area is greater than 90°, and the processing module further comprises a plurality of first processors coupled to the plurality of image capturing modules for dividing the plurality of captured images into equal parts according to a disposition of the plurality of image capturing modules on the optical touch control device or a relative disposition between the plurality of image capturing modules and at least another optical touch control device.

2. The optical touch control device of claim 1, wherein the processing module comprises:
   a second processor, coupled to the plurality of first processors, for determining the touch status according to the equally divided parts of the plurality of images.

3. The optical touch control device of claim 2, wherein a plurality of capture angles of the plurality of image capturing modules relative to the detection area are 360°.

4. The optical touch control device of claim 3, wherein the plurality of first processors divide the plurality of images into equal parts of 0°-90°, 90°-180°, 180°-270°, and 270°-360°, respectively.

5. The optical touch control device of claim 2, wherein a plurality of capture angles of the plurality of image capturing modules relative to the detection area are 180°.

6. The optical touch control device of claim 5, wherein the plurality of first processors divide the plurality of images into equal parts of 0°-90° and 90°-180°, respectively.

7. The optical touch control device of claim 1 further comprising a lighting unit, for generating a light source to assist the plurality of image capturing modules to capture the plurality of images on the detection area.

8. The optical touch control device of claim 7, wherein the lighting unit is an infra-red light source.

9. An optical touch control system, comprising:
   a plurality of optical touch control devices, each optical touch control device comprising:
      a detection area;
      a plurality of image capturing modules, for capturing a plurality of images on the detection area; and
      a processing module, coupled to the plurality of image capturing modules, for determining a touch status on the detection area according to variations of the plurality of images; and
   a touch processor, coupled to each processing module of the plurality of optical touch control device, for calculating a global touch status according to the touch status determined by the each processing module;
   wherein a capture angle captured by each of the plurality of image capturing modules relative to the detection area is greater than 90°, and the processing module further comprises a plurality of first processors coupled to the plurality of image capturing modules for dividing the plurality of captured images into equal parts according to a disposition of the plurality of image capturing modules on the optical touch control device or a relative disposition between the plurality of image capturing modules and at least another optical touch control device.

10. The optical touch control system of claim 9, wherein the processing module comprises:
    a second processor, coupled to the plurality of first processors, for determining the touch status according to the equally divided parts of the plurality of images.

11. The optical touch control system of claim 10, wherein a plurality of capture angles of the plurality of image capturing modules relative to the detection area are 360°.

12. The optical touch control system of claim 11, wherein the plurality of first processors divide the plurality of images into equal parts of 0°-90°, 90°-180°, 180°-270°, and 270°-360°, respectively.

13. The optical touch control system of claim 10, wherein a plurality of capture angles of the plurality of image capturing modules relative to the detection area are 180°.

14. The optical touch control system of claim 13, wherein the plurality of first processors divide the plurality of images into equal parts of 0°-90° and 90°-180°, respectively.

15. The optical touch control system of claim 9 further comprising a lighting unit, for generating a light source to assist the plurality of image capturing modules to capture the plurality of images on the detection area.

16. The optical touch control device of claim 10, wherein the lighting unit is an infra-red light source.

17. The optical touch control system of claim 9, wherein adjacent optical touch control devices of the plurality of optical touch control devices share image capturing modules.

* * * * *